United States Patent [19]

Rapoport

[11] Patent Number: 4,953,716
[45] Date of Patent: Sep. 4, 1990

[54] ACCESSORY TRAY

[76] Inventor: Mitchell Rapoport, Box 324, Woodstock, N.Y. 12498

[21] Appl. No.: 304,321

[22] Filed: Jan. 31, 1989

[51] Int. Cl.⁵ .............................................. A47F 5/00
[52] U.S. Cl. .................................... 211/107; 108/152; 211/175; 248/230
[58] Field of Search .......................... 108/149, 152, 93; 211/107, 126, 175; 248/230, 51

[56] References Cited

U.S. PATENT DOCUMENTS

| 90,785 | 6/1869 | Ruggles | 108/152 |
| 92,109 | 6/1869 | Shivey et al. | 108/152 |
| 3,530,996 | 9/1970 | Schaffer | 248/230 X |
| 3,620,174 | 11/1971 | Dentino | 108/152 X |
| 3,822,847 | 7/1974 | Emmons | 108/152 X |
| 3,983,823 | 10/1976 | McDonnell | 108/152 X |

Primary Examiner—Robert W. Gibson, Jr.

[57] ABSTRACT

An accessory tray for use with a video or camera tripod to hold items used with the video or camera and having an adjustable clamp for mounting on the tripod and a slidable extension for enlarging the available surface area. An anchor is provided for securing utility lines to the tray and openings are provided in the corners of the tray for feeding utility lines from beneath the tray to equipment on the tray. A lip is provided on one edge of the tray to prevent items from being pushed off the outside edge opposite from the tripod.

4 Claims, 3 Drawing Sheets

ACCESSORY TRAY

BACKGROUND OF THE INVENTION

The present invention relates to accessory trays and more particularly to an accessory tray for use when mounted on a tripod.

In the use of a tripod, whether the camera is photographic, movie, or video, numerous accessories are required by the operator. To date, a separate table had to be used to hold such accessories whether lenses for a photographic camera, a monitor for a video camera, or any other item needed with the equipment on the tripod. Having such accessories readily available on the tripod, particularly with an accessory tray having features which make it especially adaptable for use with the activities for which a tripod is used, is a great advantage.

The novel features which are considered as characteristic of the invention are set forth with particularity in the appending claims. The invention itself, however, as to its construction and obvious advantages will be best understood from the following description of the specific embodiment when read with the accompanying drawings.

SUMMARY OF THE INVENTION

The present invention provides an accessory tray which can be clamped directly to the neck of a tripod. A clamp is affixed to one edge of the tray which permits connection of the tray to posts having a wide range of diameters. A sliding section, fitted beneath a fixed-tray section, permits a near doubling of available surface area. An anchor affixed to the surface of the fixed-tray section, adjacent the edge opposite from the edge where the sliding section can be pulled out, provides a means for securing a utility line to the tray. Holes in the two leading corners of the sliding-tray section provide, as well as holes in the opposite edge of the fixed-tray section, access for utility lines from beneath the tray. A raised lip along the edge of the fixed-tray section opposite from the edge where the clamp is located serves to assist in preventing accessories from being inadvertently pushed off the accessory tray.

DESCRIPTION OF THE DRAWINGS

The present invention may be better understood and its numerous advantages will be apparent to those skilled in the art by reference to the accompanying drawings, wherein like reference numerals refer to like elements on the various figures in which.

DETAILED DESCRIPTION OF THE INVENTION

Figure 1:
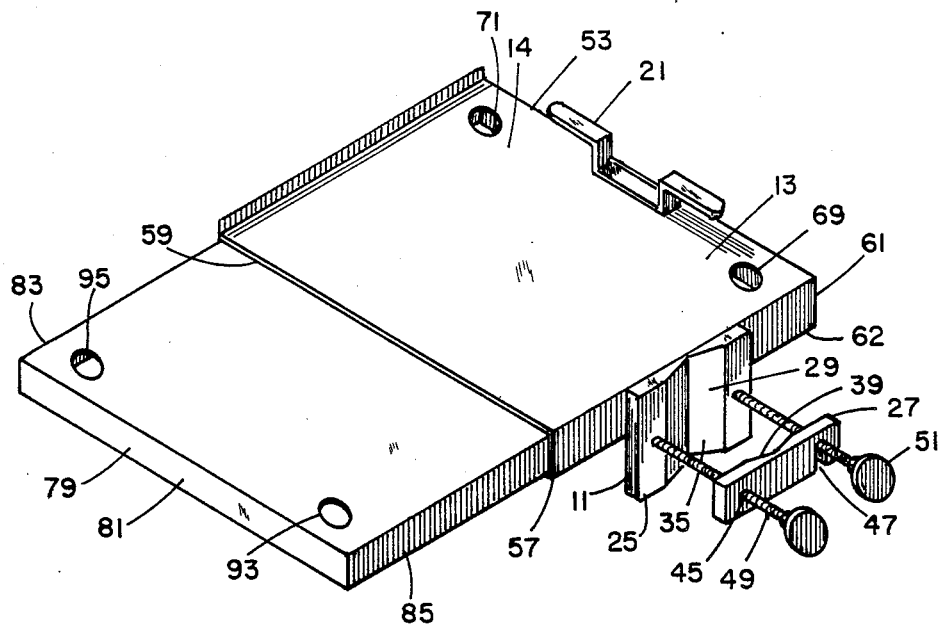
FIG. 1 is a perspective view of the top surface of the accessory tray with the sliding section extended and showing the clamp shown open.
Figure 2:
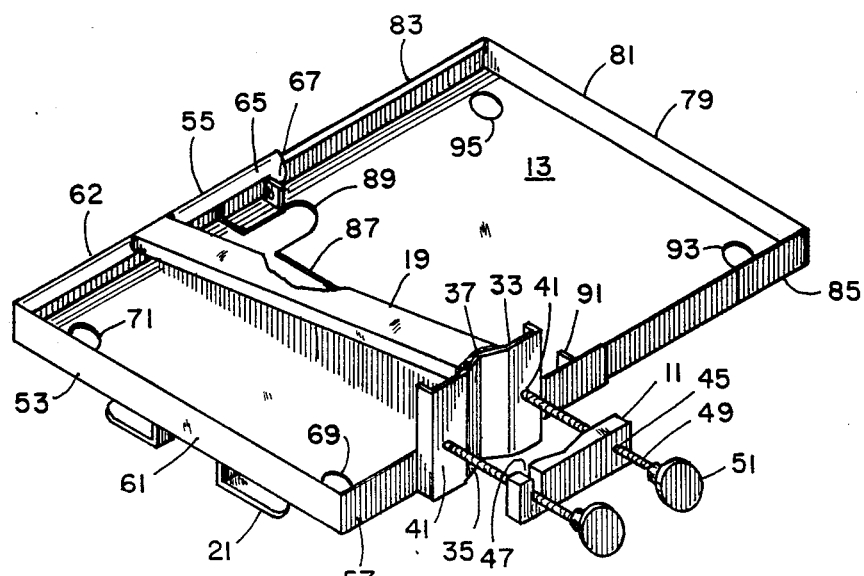
FIG. 2 is a perspective view of the bottom or under surface of the accessory tray with the sliding section extended and showing the clamp and the support member.
Figure 3:
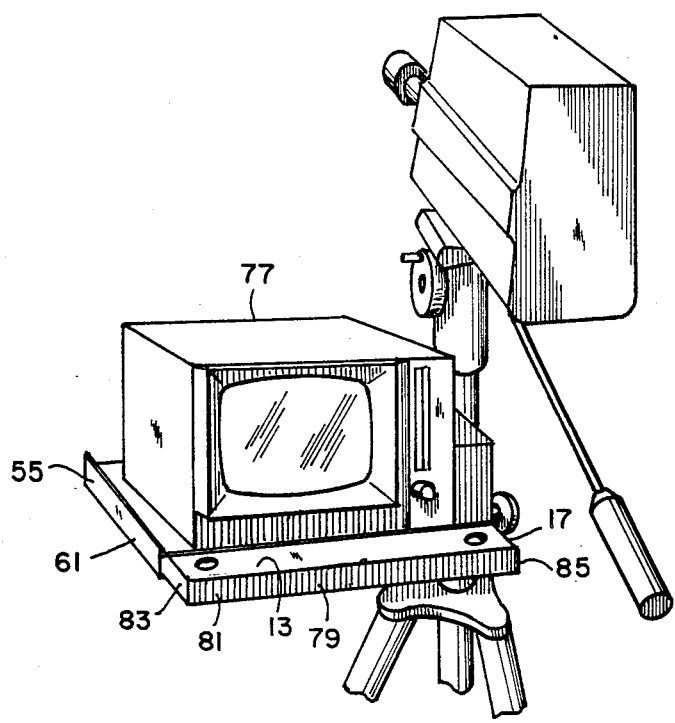
FIG. 3 is a perspective view of the accessory tray clamped to a tripod with a video camera mounted on the tripod and with a video screen on the accessory tray with the sliding section of the accessory tray only slightly extended.
Figure 4:
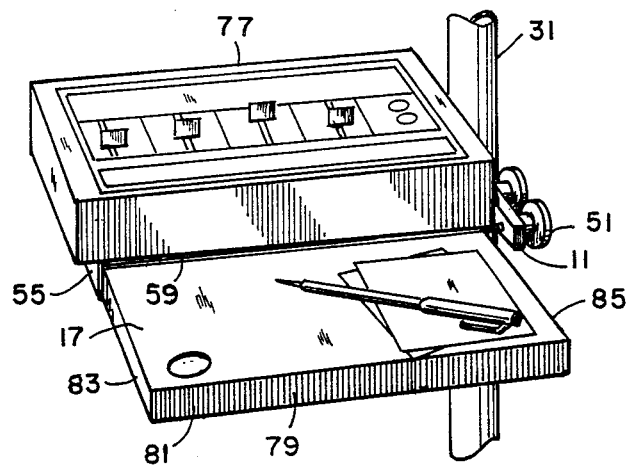
FIG. 4 is a perspective view of the accessory tray clamped to a post such as the neck of a tripod with a control box on the fixed section of the accessory tray and with the sliding-tray section fully extended and having a pen and paper on the sliding-tray section for note taking.
Figure 5:
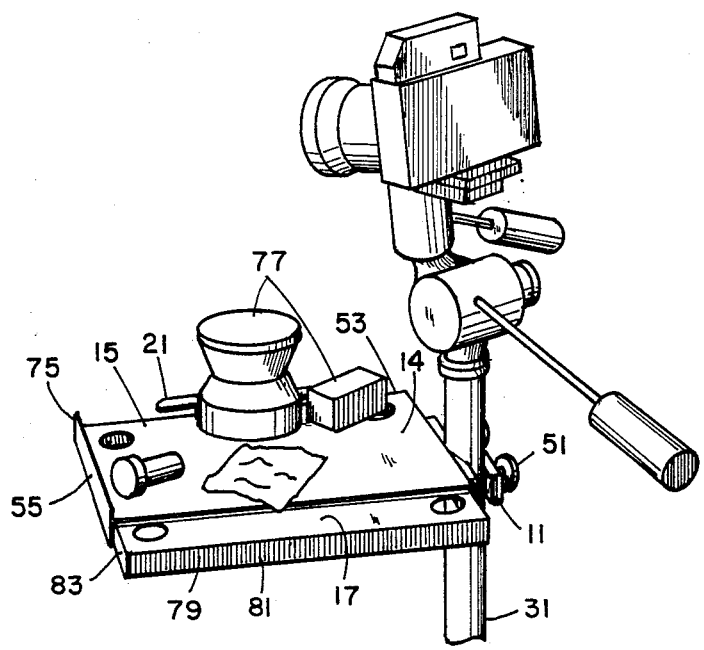
FIG. 5 is a perspective view of the accessory tray clamped to a tripod with a photographic camera mounted on the tripod with the sliding-tray section of the accessory tray only slightly extended and having photographic accessories on the fixed-tray section of the accessory tray.

Referring now to FIG. 1, the accessory tray has a clamping means 11, a tray portion 13 including a fixed-tray section 15 and a sliding-tray section 17, a support member 19 and an anchor 21 for utility lines 23.

The clamping means 11, includes an inner section 25 and an outer section 27. The inner section 25 is rigidly secured to the fixed-tray section 15 and extends below the fixed-tray section 15. The inner section 25 of the clamping means 11 has an outer surface 29 which provides a contact area which is pressed against a post or pole 31 to which the accessory tray is affixed. The inner section 25 of the clamping means 11 also has an inner surface 33 opposite from the outer surface 29 where the contact area is located. The contact area of the inner section 25 has two surfaces 35 which meet at an obtuse angle along a vertical line 37 so as to be able to be secured to a wide range of different size poles such as a pole 31 having a diameter as small as $\frac{3}{4}$ of an inch or as large as $2\frac{1}{2}$ inches.

The inner section 25 of the clamping means 11 has a vertical length of approximately two and one-half inches while the outer section 27 of the clamping means 11 has a vertical dimension of approximately one inch, making a ratio between the vertical dimension of the inner section 25 and the outer section 27 approximately of two and one-half to one.

The outer section 27 and the inner section 25 of the clamping means 11 both have a horizontal width of approximately three and one-third inches. The outer section 27 also has a contact area with two surfaces 39 which meet at an obtuse angle substantially the same as the two surfaces 35 of the contact area of the inner section 25 of the clamping means 11.

Two holes 41 are provided through the inner section 25 generally midway along the vertical length of the inner section 25, each of the holes 41 being located adjacent opposite vertical edges of the inner section 25. A pair of threaded collars (not shown) are rigidly affixed on the inner surface 33 of the inner section 25 to provide a female thread, but in place of the pair of threaded collars (not shown), each of the holes 41 may itself be threaded.

The outer section 27 of the clamping means 11 also has two holes or openings 45 through it which align with the two holes 41 in the inner section 25, but one of the holes 47 of the two holes 45 in the outer section 27 is U-shaped and extends to an outside edge of the outer section 27.

A pair of bolts 49 each having a knob 51 at its outer end, are threaded into the threaded collars 43, first having been passed through the holes 41 in the inner section 25 as well as through the two holes 45 in the outer section 27. Since the one opening 47 in the outer section 27 is U-shaped, the U-shaped opening 47 can be placed over the bolt 49 without the bolt 49 being placed through it. In this way, the clamping means can be readily opened without removing the bolts 49. The U-shaped opening 47 is preferably inverted over the bolt 49 so as to be held on the bolt 49 by gravity and is toward the edge of the accessory tray where the anchor 21 is located.

The sliding-tray section 17 which slidably fits beneath the fixed-tray section 15 permits, by pulling out the sliding-tray section 17, a near doubling of the surface area 14 of the accessory tray. When viewing the accessory tray with the clamping means 11 in the foreground, as seen in FIG. 1, the fixed-tray section 15 has a rear edge 53 to the right, a far-side edge 55 opposite from the clamping means 11, and a near-side edge 57 on which the clamping means 11 is rigidly mounted and also a front edge 59 to the left.

The front edge 59 of the fixed-tray section 15 is open to permit access by the sliding-tray section 17. The other three edges of the fixed-tray section 15, namely the rear edge 53 and the far-side edge 55 and near-side edge 57, include an apron 61 located at substantially right angles to the surface area 14 of the fixed-tray section 15. The apron 61 includes a lower edge 62. The apron 61 on the far-side edge 55 and the near-side 57 of the fixed-tray section 15 includes a lip 63 bent upwardly at an acute angle from the lower edge 62 of the apron 61 to form a V-shaped groove 65 in which the sliding-tray section 17 is slidably mounted. Rigidly affixed to the end of the V-shaped groove 65, at the front edge 59 of the fixed-tray section 15, an extension member 67 is provided which extends above the V-shaped groove 65 to serve as a stop, as subsequently described herein.

Figure 6:
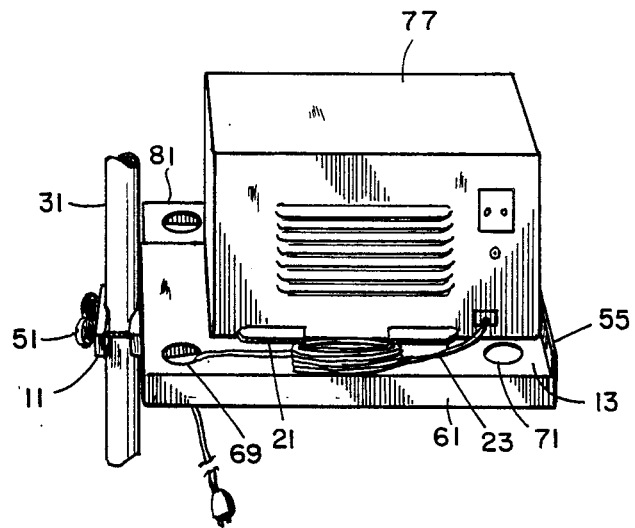
FIG. 6 is a perspective view of the accessory tray taken from the rear area of the accessory tray and with the accessory tray affixed to a post such as found on a tripod showing the rear area of a video screen on the fixed-tray section of the accessory tray and with the utility line of the video screen secured to the anchor and with the end of the utility line extended through one of the openings provided in the accessory tray.

In the corner of the fixed-tray section 15, formed by the rear edge and the near-side edge, an access opening 69 which is circular in shape, is provided through the fixed-tray section 15. Similarly, in the corner of the fixed-tray section 15, formed by the far-side edge 55 and the rear edge 53, another access opening 71, which is also circular in shape, is provided through the fixed-tray section 15. Both access openings 69, 71 have substantially the same diameter and permit the feeding of cables and other utility lines 73 from beneath the accessory tray to equipment located on the accessory tray as best seen in FIG. 6.

Mounted along the rear edge 53 of the fixed-tray section 15, on the surface area 14, substantially midway between the two access openings 69, 71 is the anchor 21 which is two inverted L-shaped members about which the utility lines 23 can be wrapped.

Secured to the apron 61 on the far-side edge 55 of the fixed-tray section 15 is a lip member 75 which extends down the apron 61 and up above the surface area 14 of the fixed-tray section 15. The lip member 75 provides a stop edge so that articles 77 located on the surface area 14 of the fixed-tray section 15 cannot readily slide off the surface area 14.

The sliding-tray section 17 has an apron 79 along its front edge 81 and far-side edge 83 and near-side edge 85. The sliding-tray section 17 does not have an apron 79 along its rear edge 87. The front edge 81, far-side edge 83, near-side edge 85 and rear edge 87 of the sliding-tray section 17 correspond in location with the front edge 59, far side edge 55, near side edge 57 and rear edge 53 of the fixed-tray section 15. Two U-shaped openings 89 are cut out of the sliding-tray section 17 so that when the sliding-tray section 17 is completely within the fixed-tray section 15, both access openings 69, 71 in the fixed-tray section 15 are not blocked by the sliding-tray section 17.

A pair of angle members 91 are mounted on the inside of the apron 79 of the sliding-tray section 17 adjacent the pair of U-shaped openings 89 and adjacent the rear edge of the sliding-tray section 17. The pair of angle members 91 are also so located as to be above the V-shaped groove 65 of the fixed-tray section 15, but are located so as to strike the extension member 67 which is rigidly secured to the fixed-tray section 15 as previously described. In this way, the sliding-tray section 17 can be fully extended, but will not disengage from the fixed-tray section 15.

In the corner of the sliding-tray 17, formed by the near-side edge 85 and the front edge 81 of the sliding-tray section 17, there is an access opening 93, circular in shape, and in the corner of the sliding-tray section 17, there is another access opening 95, also having a circular shape. All four access openings 69, 71, 93, 95 are not only of the same shape, namely circular, but also have substantially the same size and diameter.

The accessory tray, when clamped to the pole or post 31 of a tripod, provides a highly secure and accessible work area of varying size with access openings 69, 71, 93, 95 for utility lines 23 and the anchor 21 to secure utility lines 23 to prevent a utility line 23 from being pulled inadvertently from the equipment being used. The anchor 21 also serves to prevent accessories from sliding off the rear edge 57 of the fixed-tray section 15 of the accessory tray.

The support member 19 is substantially a straight bar with a U-shaped cross section secured at one end to the lower edge 62 of the apron 61 of the far-side edge 55 of the fixed-tray section 15 and at the other end to the bottom edge of the inner section 25 of the clamping means 11. The support member 19 is located at an acute angle to the surface area of the fixed-tray section and is substantially parallel to the front edge 59 and the rear edge 57 of the fixed-tray section 15.

While a preferred embodiment has been shown and described, various modifications and substitutions may be made without departing from the spirit and scope of this invention. Accordingly, it is understood that this invention has been described by way of illustration rather than limitation.

I claim:

1. An accessory tray for use when clamped to a pole, such as the neck of a tripod, to provide a work surface area for holding accessories, such accessory tray comprising:

a fixed-tray section having a surface area of substantially rectangular shape with four corners and with a near side edge, a far-side edge, a rear edge and a front edge, said rear edge; near-side edge and far-side edge, having an apron with a lower edge extending downwardly substantially at right angles from the fixed surface area, the lower edge of the apron along the near-side edge and the far-side edge bending upwardly to form a V-shaped groove, said fixed-tray section having a pair of access openings through the surface area thereof, one access opening being located in the corner formed by the near-side edge and the rear edge and another access opening being located in the corner formed by the far-side edge and the rear edge;

a clamping means affixed to the near-side edge of the fixed-tray section, said clamping means including an inner section with a pair of openings and thread means and an outer section with a pair of openings and with a pair of threaded bolts slidably engaging the outer section and engaging the thread means of the inner section;

a sliding-tray section having a surface area of substantially rectangular shape with four corners and with a near-side edge, a far-side edge, a rear edge and a front edge, said front edge, near-side edge and far side edge having an apron extending downwardly, substantially at right angles from the surface area of the sliding tray section, said sliding tray section having a pair of access openings through the surface area thereof, one access opening being located in the corner formed by the near-side edge and front edge and another access opening being located in the corner formed by the far side edge and the front edge; the apron on the far side edge and the near side edge of the sliding tray section being slidably mounted in the V-groove of the fixed tray section;

means mounted on the sliding tray section and the fixed tray section to limit the extent to which the sliding tray section can be extended from the fixed tray section;

an anchor affixed to the surface area of the fixed tray section along the rear edge thereof substantially midway between the two access openings in the fixed tray section for holding utility lines and to prevent accessories from sliding off the rear edge of the fixed-tray section and;

a support means connected to the clamping means and the apron on the far side edge of the fixed tray section.

2. An accessory tray according to claim 1 wherein the inner section of the clamping means has an outer surface with a contact area, said contact area having two parts which meet at an obtuse angle.

3. An accessory tray according to claim 1 wherein the access openings in both the fixed tray section and the sliding tray section have a circular shape.

4. An accessory tray according to claim 1 wherein the means to limit the extent to which the sliding tray section can be extended from the fixed tray section includes an extension member rigidly affixed to the end of the V-shaped groove at the front edge of the fixed tray section which extends above the V-groove and a pair of angle members mounted on the inside of the apron of the sliding tray section near the rear edge of the sliding tray section and above the V-shaped groove of the fixed tray section.

* * * * *